United States Patent
Delbecq et al.

(10) Patent No.: US 10,897,502 B2
(45) Date of Patent: Jan. 19, 2021

(54) SYSTEMS AND METHODS FOR DEVICE MIGRATION

(71) Applicant: OVH, Roubaix (FR)

(72) Inventors: Adrien Delbecq, Lille (FR); Gautier Charlet, Villeneuve d'Ascq (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/506,566

(22) Filed: Jul. 9, 2019

(65) Prior Publication Data

US 2020/0028904 A1    Jan. 23, 2020

(30) Foreign Application Priority Data

Jul. 20, 2018 (EP) .................................. 18315018

(51) Int. Cl.
*H04L 29/08* (2006.01)
*G06F 3/06* (2006.01)
*H04L 12/24* (2006.01)

(52) U.S. Cl.
CPC .......... *H04L 67/1095* (2013.01); *G06F 3/067* (2013.01); *G06F 3/0614* (2013.01); *G06F 3/0647* (2013.01); *H04L 41/0846* (2013.01); *H04L 41/145* (2013.01)

(58) Field of Classification Search
CPC ............. H04L 67/1095; H04L 41/0846; H04L 41/145; G06F 3/0614; G06F 3/0647; G06F 3/067
See application file for complete search history.

(56) References Cited

U.S. PATENT DOCUMENTS

| | | | |
|---|---|---|---|
| 8,054,763 B2 | 11/2011 | Mehrotra et al. | |
| 8,341,251 B2 | 12/2012 | Gao et al. | |
| 8,549,129 B2 | 10/2013 | Zager et al. | |
| 8,793,448 B2 | 7/2014 | Nunez et al. | |
| 9,391,843 B1 | 7/2016 | Saha et al. | |
| 9,697,266 B1 | 7/2017 | Nagesh et al. | |
| 9,755,900 B2 | 9/2017 | Tenginakai et al. | |
| 2010/0211662 A1 | 8/2010 | Glendinning et al. | |
| 2011/0276675 A1* | 11/2011 | Singh | G06F 9/4856 709/223 |
| 2011/0276821 A1* | 11/2011 | Gudlavenkatasiva | G06F 11/0751 714/3 |
| 2012/0179817 A1* | 7/2012 | Bade | H04L 67/38 709/225 |
| 2012/0300783 A1 | 11/2012 | Chen et al. | |
| 2016/0171374 A1* | 6/2016 | Kim | H04L 43/16 706/46 |

(Continued)

OTHER PUBLICATIONS

European Search Report with regard to the counterpart EP Patent Application No. 18315018.4 dated Jan. 17, 2019.

*Primary Examiner* — Christopher B Robinson
(74) *Attorney, Agent, or Firm* — BCF LLP

(57) ABSTRACT

Methods and systems are described for performing a migration from source networking devices to replacement networking devices. A simulation may be performed of the migration from the source devices to the replacement devices. The simulation may be used to determine whether to proceed with the migration. A technician may be instructed to perform the migration. A verification may be performed to determine whether the migration was successful. The source devices may be decommissioned.

20 Claims, 9 Drawing Sheets

(56) References Cited

U.S. PATENT DOCUMENTS

| | | | |
|---|---|---|---|
| 2016/0191365 A1* | 6/2016 | Wakeman | H04L 43/10 709/224 |
| 2016/0315803 A1 | 10/2016 | Sadana et al. | |
| 2017/0171058 A1* | 6/2017 | Wang | H04L 45/42 |
| 2017/0180196 A1* | 6/2017 | Patel | H04L 41/0859 |
| 2018/0020077 A1* | 1/2018 | Folco | G06F 9/5088 |
| 2019/0036789 A1* | 1/2019 | Kaplunov | H04L 45/22 |

* cited by examiner

SYSTEMS AND METHODS FOR DEVICE MIGRATION

CROSS-REFERENCE

The present application claims priority from European Patent Application no 18315018.4, which was filed on Jul. 20, 2018, the disclosure of which is incorporated by reference herein in its entirety.

FIELD

Embodiments described herein relate generally to systems and methods for managing networking devices, and more particularly, to systems and methods for managing migration from source networking devices to replacement networking devices.

BACKGROUND

Networking devices, such as routers and switches, may be used in a network to provide access to the network. In certain instances, it may be desirable to migrate, i.e. replace, networking devices. For example a migration may be performed from an aging router nearing its end-of-life date to a new router.

The process for migrating network devices can be complex, can cause downtime for systems, and can take a large amount of time for a team of technicians and network engineers to perform. It might be preferable to reduce the amount of downtime caused by migrating networking devices. It might also be preferable to reduce the number of engineers involved with the migration and the amount of time used by the engineers to perform the migration.

SUMMARY

The following summary is for illustrative purposes only, and is not intended to limit or constrain the detailed description. The following summary merely presents various described aspects in a simplified form as a prelude to the more detailed description provided below.

In certain instances, it may be preferable to remove one or more networking devices ("source devices") and replace them with one or more different networking devices ("replacement devices"). For example, the replacement devices may be newer than the source devices, the replacement devices may provide functionality not offered by the source devices, the replacement devices may be more efficient than the source devices, the replacement devices may use less physical space than the source devices, and/or the replacement devices may use less energy than the source devices.

A networking device migration system may be used to plan and perform the migration from the source devices to the replacement devices. The networking device migration system may receive a selection of source devices. The networking device migration system may simulate the migration. The networking device migration system may instruct a user to remove cables from the source devices and connect the cables to the replacement devices. The networking device migration system may verify that the migration was successful.

An object of the present technology relates a computer-implemented method for execution by one or more computing devices, the method comprising:

receiving, a request to perform a migration from one or more first networking devices to one or more second networking devices;

performing a simulation of the migration from the one or more first networking devices to the one or more second networking devices, the performing of the simulation comprising determining whether the one or more second networking devices can provide services previously provided by the one or more first networking devices;

after determining that the one or more second networking devices can provide services previously provided by the one or more first networking devices, performing the migration from the one or more first networking devices to the one or more second networking devices, the performing of the migration comprising causing functions previously performed by the one or more first networking devices to now be performed by the one or more second networking devices;

after one or more cables attached to the one or more first networking devices have been disconnected from the one or more first networking devices and have been attached to the one or more second networking devices, determining that one or more servers are accessible via the one or more second networking devices; and after determining that the one or more servers are accessible via the one or more second networking devices, updating one or more databases to refer to the one or more second networking devices.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Networks of devices, such as networks housed in a data center, may comprise a variety of different networking hardware, such as routers, switches, multilayer switches, cables, and/or other networking hardware. The networking devices may service various computing devices, such as servers. In certain instances an entity operating the networking devices may wish to replace some of the networking devices or reconfigure the network. Networking devices may be replaced because they are approaching an end-of-life date, because newer hardware is available, or for other reasons. The entity may wish to reconfigure the infrastructure of the network, such as by converting the network from a legacy three tier architecture (access, distribution, & core) to an IP fabric architecture (clos topology, with leaf and spine).

In order to facilitate the migration from source devices to replacement devices, a migration system may perform all or portions of the activities involved in the migration. The migration system may assist a technician in planning the migration. The migration system may provide instructions to a technician performing the migration. The migration system may manage any errors that occur during the migration. The migration system may verify that the migration was successful.

Figure 1:
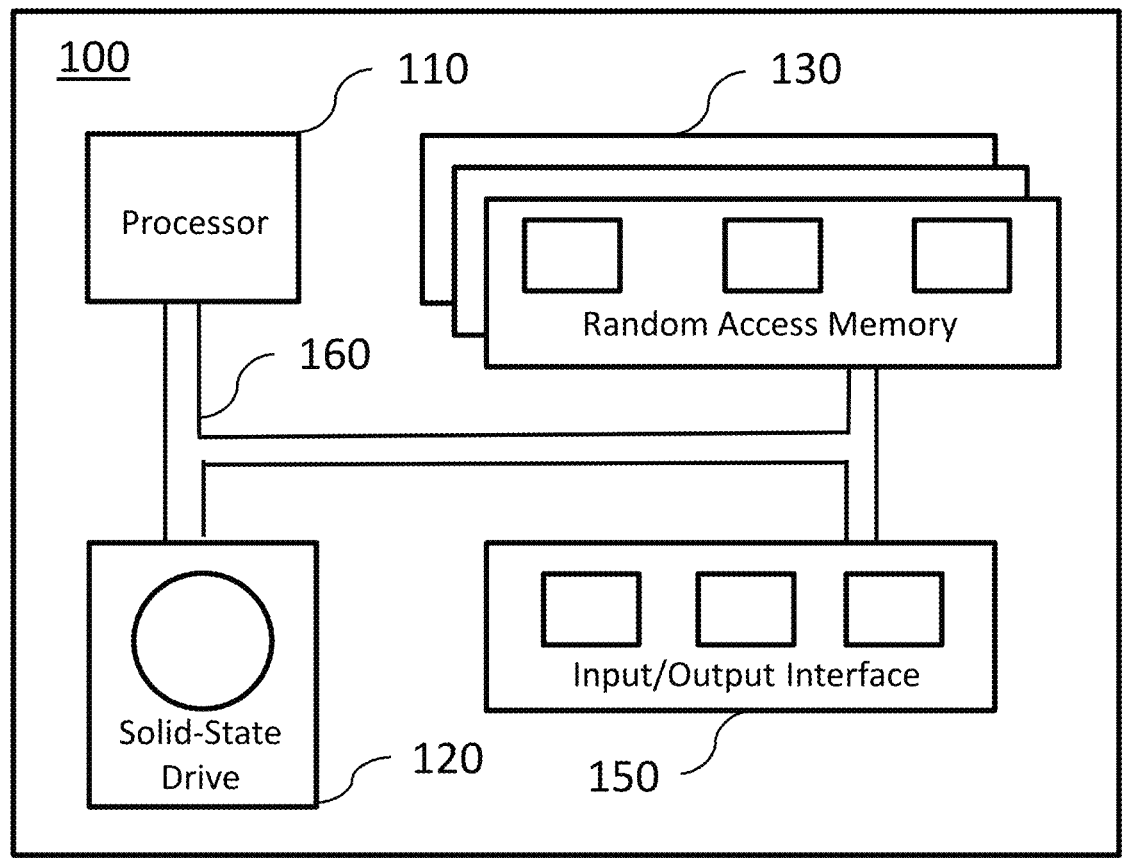
FIG. 1 shows an example computing system that may be used to implement any of the methods described herein.

FIG. 1 illustrates a diagram of a computing environment 100 in accordance with an embodiment of the present technology. In some embodiments, the computing environment 100 may be implemented by any of a conventional personal computer, a server, a router, a switch, a controller, and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for operating in a data center environment. The computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

Figure 2A:
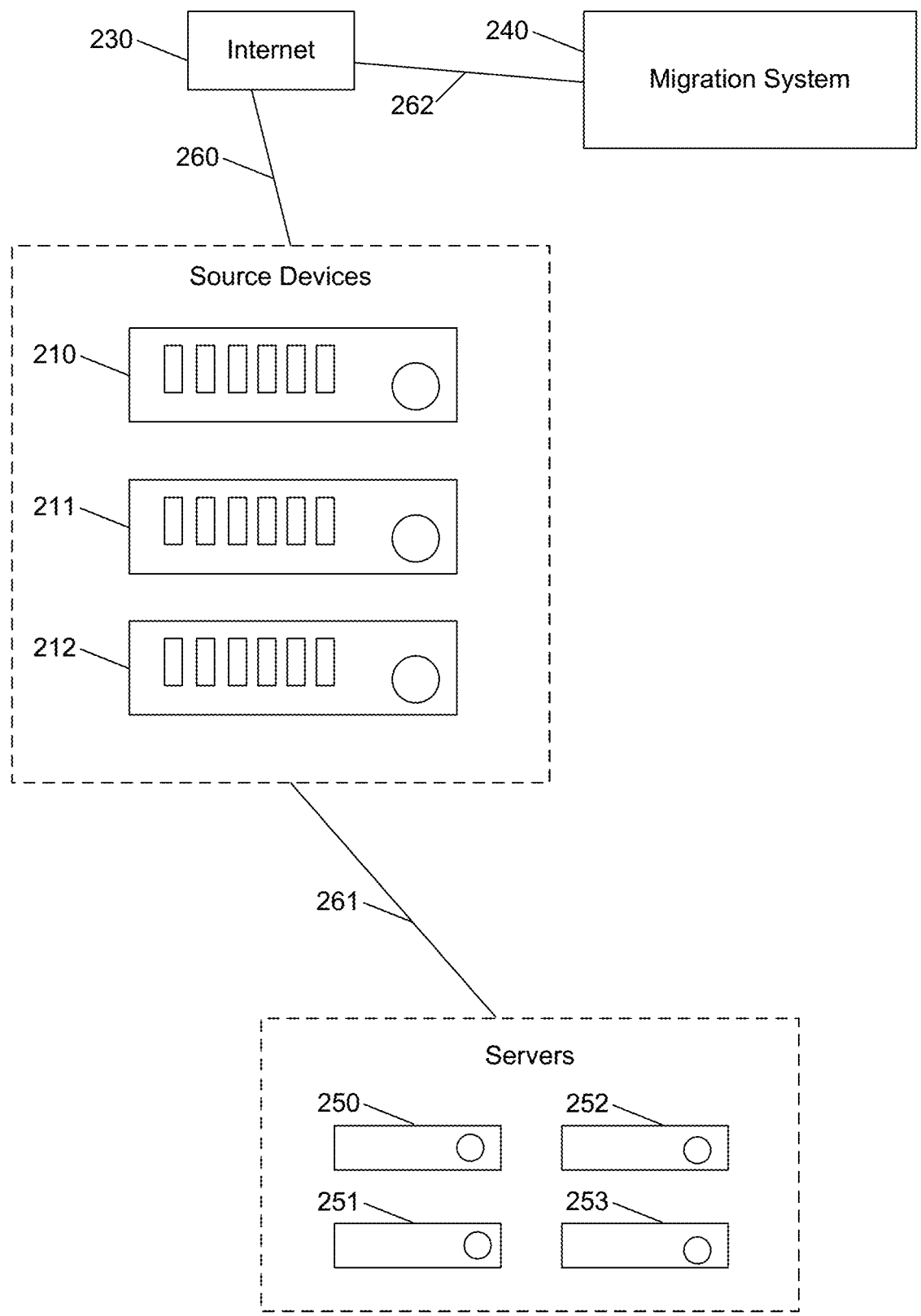
FIGS. 2A-C show diagrams of networking device migration according to one or more illustrative aspects of the disclosure.

FIG. 2A shows an exemplary diagram of networking devices before migration according to one or more illustrative aspects of the disclosure. In the example illustrated in FIG. 2A, source devices 210-12 provide networking services, such as access to the internet 230, to servers 250-53. The source devices 210-12 may comprise any combination of routers, switches, devices that perform routing and switching functions, multilayer switches, or any other networking devices. The source devices 210-12 may be connected to the internet via one or more uplinks 260. All or a portion of the devices illustrated in FIG. 2A may be housed within a data center.

The servers 250-53 may be connected to the source devices 210-12 via uplink 261. Although illustrated as a single link, uplink 261 may comprise multiple links between the servers 250-53 and source devices 210-212. For example, server 250 might be connected to source device 210 via one uplink 261, and server 252 might be connected to source device 212 via a different uplink 261. The uplink 261 may comprise one or more networking cables.

Migration system 240 may be used to perform a networking device migration. The migration system 240 may be connected to the internet 230 via a link 262, and may be accessed via the internet 230. The migration system 240 may be directly connected to the source devices 210-12 and/or the servers 250-53. A technician may access the migration system 240, and the migration system 240 may provide a user interface, such as a web interface, for the technician to perform a networking device migration. The migration system may communicate with source devices 210-12 and/or servers 250-53, such as via the internet 230.

The migration system 240 may poll devices on the network, such as the source devices 210-12, to retrieve their configuration information. The migration system 240 may scan the network and/or analyze a database corresponding to the network to generate a network topology.

Figure 2B:
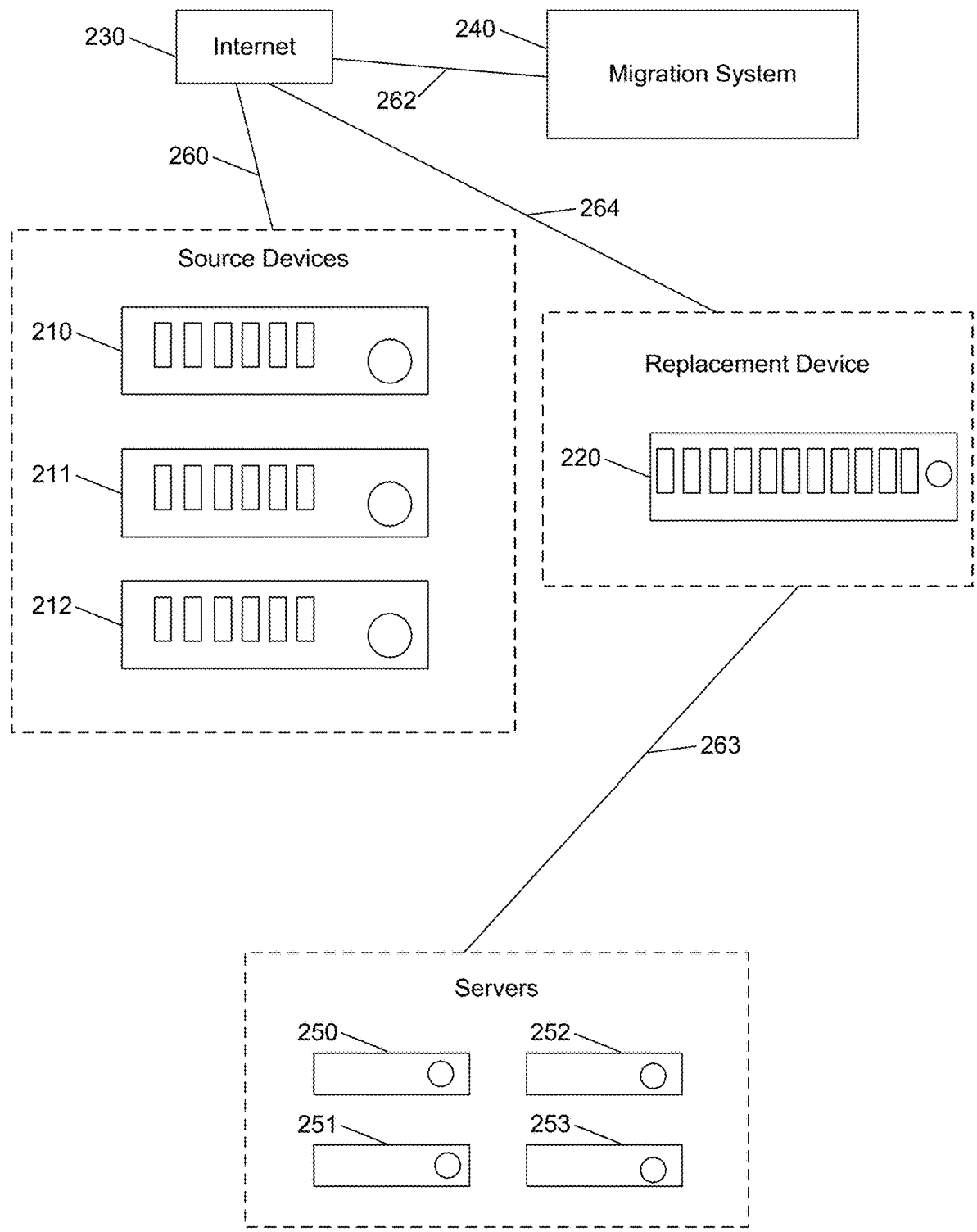

FIG. 2B shows an exemplary diagram of networking devices during migration according to one or more illustrative aspects of the disclosure. In FIG. 2B, replacement device 220 has been installed. Replacement device 220 is being installed to replace the source devices 210-12. Replacement device 220 may comprise a switch, router, devices that perform routing and switching functions, multilayer switches, or any other networking device.

The migration system 240 may simulate the migration from source devices 210-12 to the replacement device 220. If the simulation indicates that the migration will be successful, i.e. the replacement device 220 will successfully replace the functionality of source devices 210-12, then the migration system 240 may begin performing the migration from source devices 210-12 to replacement device 220. The migration system 240 may retrieve configuration from the source devices 210-12 and/or servers 250-53. The migration system 240 may use the configuration information to generate configuration information for the replacement device 220. The migration system 240 may update various databases to reflect changes made to the network during the migration. The migration system 240 may change a status of devices on the network during the migration. For example, the migration system 240 may change a status of the source devices 210-12 during the migration to indicate that those devices are not operational.

After the migration system 240 has simulated the migration from source devices 210-12 to replacement device 220, the migration system 240 may cause the uplink 263 to be connected from the servers 250-53 to the replacement device 220. The migration system 240 may display instructions to a technician to install the uplink 263. The uplink 263 may be connected by removing cables comprising the uplink 261 from the source devices 210-12, and connecting those cables to the replacement device 220. An uplink 264 may be installed to connect the replacement device 220 to the internet 230.

After the uplink 263 has been connected, the migration system 240 may verify that the migration has been successful. The migration system 240 may determine that the servers 250-53 are accessible, to the internet 230, via the replacement device 220. For example the migration system may ping each of the servers 250-53.

Figure 2C:
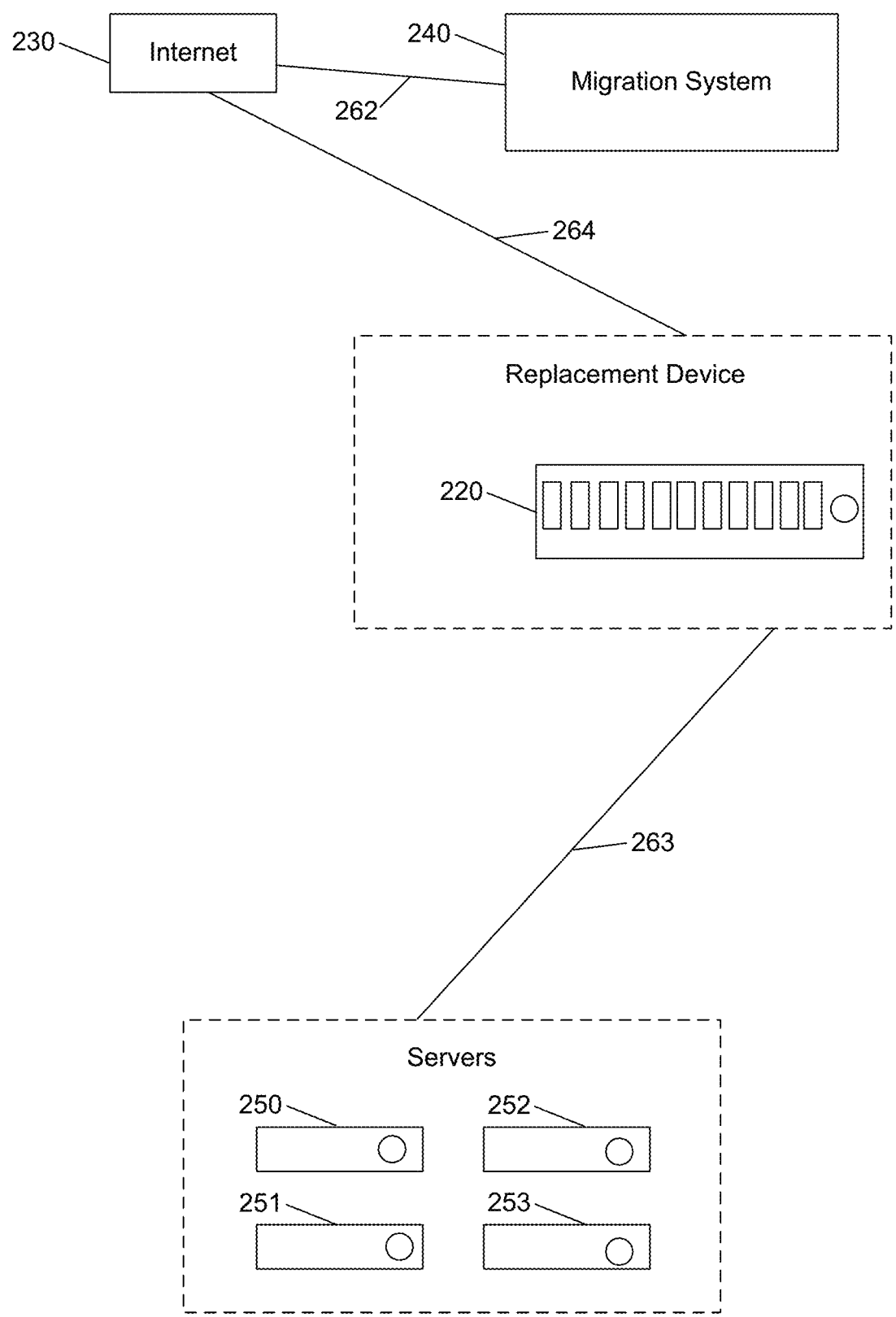

FIG. 2C shows an exemplary diagram of networking devices after migration according to one or more illustrative aspects of the disclosure. In the exemplary migration illustrated in FIG. 2C, the migration has been completed and the migration system 240 has decommissioned the source devices 210-12. Functions previously performed by the source devices 210-12 may be performed by the replacement device 220. Steps for performing the migration illustrated in FIGS. 2A-C are described below in regards to the flow diagrams illustrated in FIGS. 3-5.

Figure 3A:
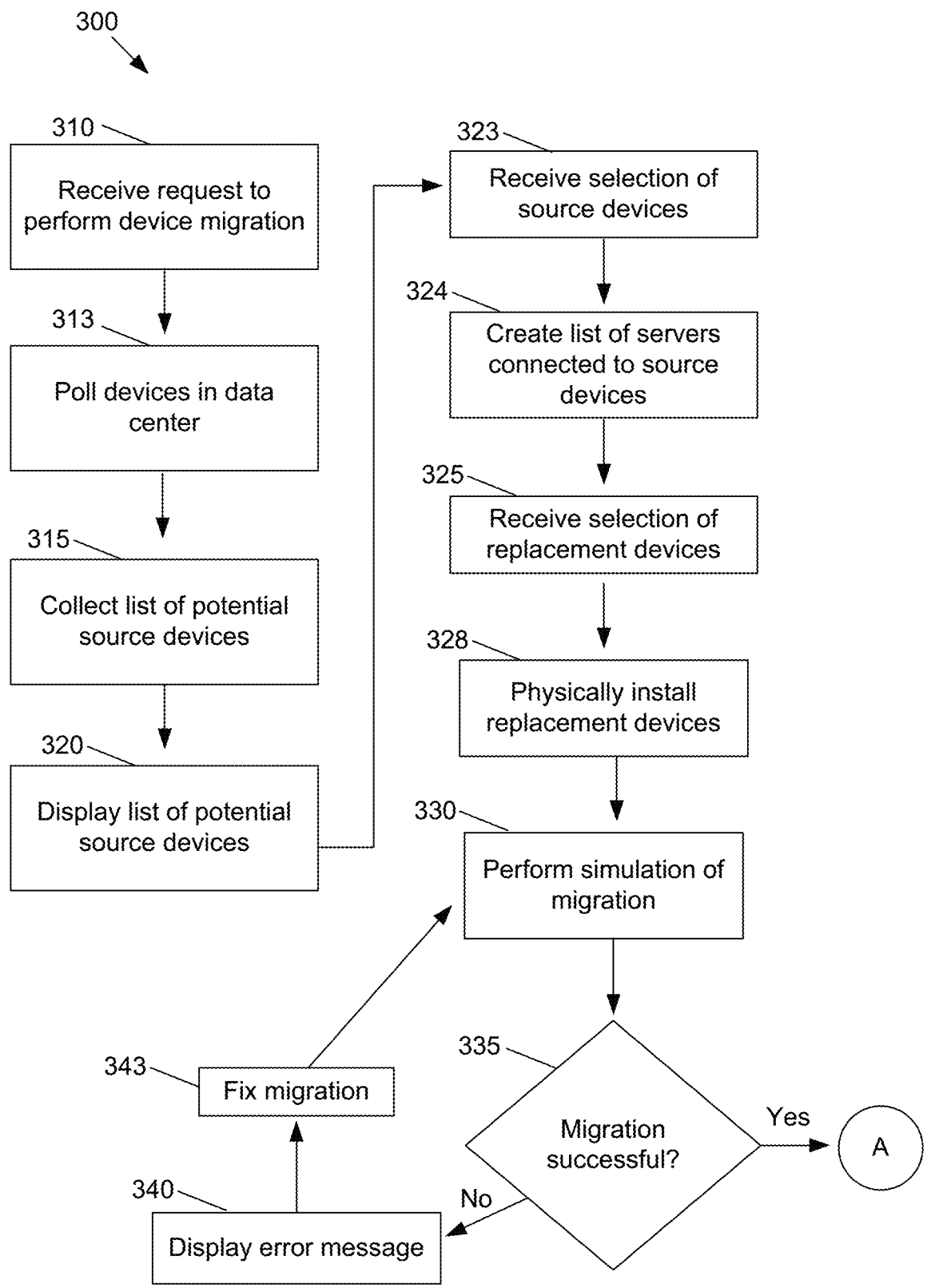
FIGS. 3A-B are a flow diagram of a method for migrating devices according to one or more illustrative aspects of the disclosure.
Figure 3B:
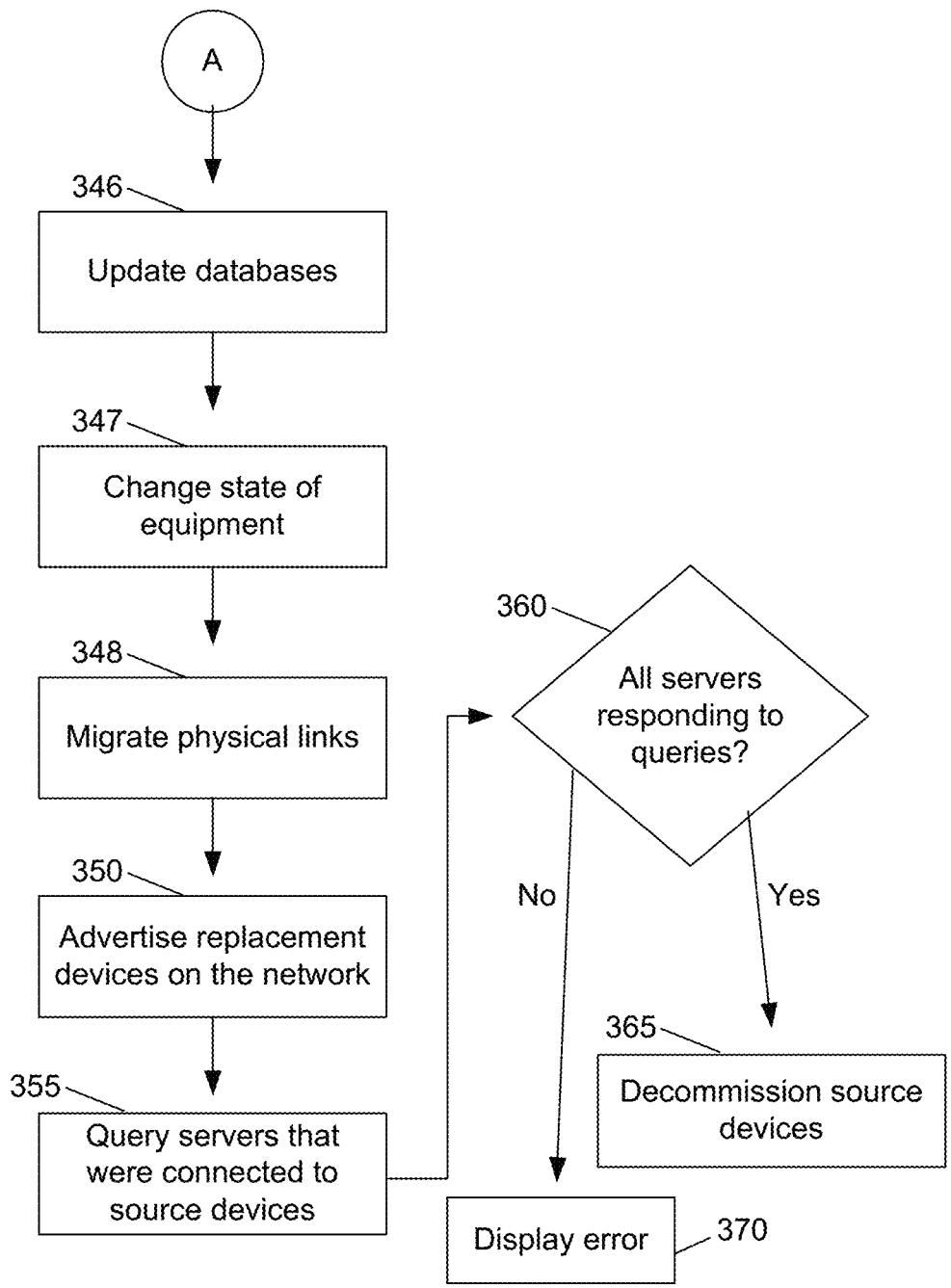

FIGS. 3A-B are a flow diagram of a method for migrating devices according to one or more illustrative aspects of the disclosure. In one or more embodiments, the method 300 or one or more steps thereof may be performed by one or more computing devices or entities. For example, portions of the method 300 may be performed by components of the computing device 100. The method 300 or one or more steps thereof may be embodied in computer-executable instructions that are stored in a computer-readable medium, such as a non-transitory computer-readable medium. Some steps or portions of steps in the flow diagram may be omitted or changed in order.

At step 310 a request to perform device migration may be received. The request may be received by a web interface, such as a web interface provided by the migration system 240. A technician may access the web interface to coordinate the migration. The request may comprise a location for the migration, a company or customer corresponding to the migration, a type of networking device for the migration, or any other information regarding the migration.

The request may comprise a type of infrastructure to migrate from and/or to migrate to. For example, the request may indicate that the migration should convert a network, or a portion of a network from a three tier architecture to an IP fabric architecture. The request may comprise an indication of one or more replacement devices to be installed. For example, the request may comprise a model number of the replacement device or an indication of capabilities of the replacement device. The request may comprise an indication of one or more source devices. For example the request may comprise a model number, serial number, MAC address, or any other indicator of the source device.

At step 313 devices in the data center may be polled to retrieve information about the devices. Routers, switches, and/or any other networking devices in the data center, or on the network, may be polled to retrieve information regarding those devices and the network. The information received in response to the requests may comprise model numbers or other identifying information, configuration parts, serial numbers of each component, physical and logical topology information, information to match the devices with their representations in a database, and/or any other information corresponding to the networking devices.

At step 315 a list of potential source devices may be collected. The list of potential source devices may be collected based on the input received at step 310. The list of potential source devices may comprise one or more switches, one or more routers, and/or other networking devices for migration.

The list of potential source devices may be collected by scanning the network for devices matching various criteria, such as criteria received at step 310. A network topology may be created to determine the potential source devices. The network topology may comprise a list of switches, routers, and/or servers connected to those switches and routers. The network topology may comprise any other information describing the network. The network topology may comprise an indication of physical considerations, such as an indication of how cables are connected in the network. For example, the network topology may indicate that a cable is connected to a specific port on a first device and a specific port on a second device.

The list of potential source devices may be filtered based on manufacturing dates of the devices, or dates the devices were placed in service. For example, the list of potential source devices may comprise switches that were manufactured prior to a selected date, or that were in service for longer than a selected amount of time.

At step 320 the list of potential source devices collected at step 315 may be displayed. The list of potential source devices may be displayed by a user interface. The display may comprise a serial number of each potential source device, a MAC address of each potential source device, a location of each potential source device, a model number of each potential source device, a firmware version of each potential source device, information describing servers connected to each potential source device, and/or any other information corresponding to the potential source devices. Different categories of information may be displayed for different devices. The display may comprise interactive elements, such as elements that permit a user to select one or more of the displayed devices.

At step 323 a selection of one or more source devices may be received. The selection may be performed using the interface displayed at step 320. The selection may be transmitted via a command line or as a parameter. The selection may comprise one or more switches, routers, and/or any other networking devices.

At step 324 a list of servers connected to the source devices selected at step 323 may be created. The list may comprise servers and/or any other devices connected to the source devices selected at step 323. The connected devices may be physically connected to the source devices, such as by network cables. The connected devices may be devices that are serviced by the source devices. For example, if a switch is selected at step 323, the list generated at step 324 may comprise all servers connected to that switch, as well as any other networking hardware connected to the switch.

At step 325 a selection of one or more replacement devices may be received. The selection may comprise one or more replacement devices to be installed and/or activated. The selection may be performed using the interface displayed at step 320. The selection may be transmitted via a command line, or as a parameter. An amount of source devices might or might not be the same as an amount of replacement devices. For example, the selections received at steps 323 and 325 may indicate that eight switches currently in service will be replaced by one new switch.

At step 328 the replacement devices and/or any other hardware may be physically installed. If the replacement devices were previously installed, this step may be skipped. A technician may be instructed to perform the installation. A user interface may be output comprising instructions for the installation. The instructions may comprise an indication of replacement devices to be installed, an indication of any other hardware to be installed, an indication of locations for the replacement devices to be installed, and any other information for installing the replacement devices. The user interface may comprise an element that can be selected if the technician is unable to perform the installation, or unable to perform a step of the installation.

The instructions may comprise one or more steps. The migration system may automatically detect when a step has been completed, and then a next step to be performed may be output on a user interface or otherwise indicated to the technician.

At step 330 a simulation of the migration may be performed. The simulation of the migration may simulate migration from the source devices selected at step 323 to the replacement devices selected at step 325. The simulation may determine whether the replacement devices can provide services previously provided by the source devices. The simulation may determine whether servers, or other devices, connected to the source devices will be accessible after the migration has been performed. The simulation may determine whether the replacement devices will have sufficient capacity to replace the source devices. The simulation may determine whether the replacement devices are compatible with other networking devices currently in place.

If the migration is intended to convert the network from one infrastructure type to another type, the simulation may determine whether this conversion will cause any errors, or cause any devices to be inaccessible. The simulation may determine whether the migration would violate any business rules, such as taking a server offline during a time period in which business rules indicate the server should not be removed from service. Steps that may be performed at step 330 are further described below in regards to FIG. 5.

The simulation may consider physical considerations of the migration. A physical distance between each of the source devices and replacement devices may be determined or estimated. The physical distance may be estimated by comparing a rack and/or room of the source device to a rack and/or room of the replacement device. The physical distance may be compared to a pre-set threshold distance to determine whether the migration can be performed. The simulation may analyze whether cables, such as network cables, can be moved from the source devices to the replacement devices.

At step 335 the results of the simulation performed at step 330 may be used to determine whether the migration selected at steps 323 and 325 can be performed. If the simulation indicated that the migration will be successful, the migration may proceed to step 346, illustrated in FIG. 3B. If the simulation indicated that the migration will fail, an error message may be displayed at step 340. The error message may indicate one or more source or replacement devices that the simulation indicated would cause an error in the migration. For example, if the migration would cause a server to go offline, where business rules indicate that the server should not be taken offline, the error message may identify the source devices that would cause the server to go offline. In this example, the error message may also indicate the business rule that would be violated by the migration.

The error message displayed at step 340 may indicate one or more suggested modifications to the migration. For example, if twelve switches were selected at step 323 as source devices, and one of those switches is determined at steps 330 and 335 to be unavailable for migration, then the error message may suggest leaving the switch that is unavailable for migration in place and migrating the other eleven switches.

At step 343 an adjustment to the migration may be received. One or more source devices may be added to or removed from the migration. One or more replacement devices may added to or removed from the migration. The adjustment may be received via a user interface, such as a web interface. The adjustment may fix the error that occurred during the simulation of the migration.

An urgent fix may be implemented during the migration to correct the immediate error and reduce the amount of downtime that would be caused by the error. A root cause of the error may be determined, such as by investigating what processes caused the error and/or how the error occurred. The root cause may be fixed to correct the error. The root cause may be flagged so that in future migrations it will be identified before the migration occurs. After the adjustments have been entered, the simulation of the migration may be performed again at step 330 with the adjusted selection of source and replacement devices.

After a successful simulation has been performed databases may be updated to indicate that the replacement devices have been installed and/or that the source devices are being migrated at step 346. The databases may indicate IP addresses of all devices in the network, MAC addresses of all devices in the network, indications of how devices are connected, and/or any other information about the network. The databases may comprise information for a single entity, such as an enterprise. The databases may comprise information for one or more physical locations. For example a database may comprise information regarding all devices located in a data center. The databases may be updated by removing any references to the source devices. The references to the source devices may be replaced by references to the replacement devices.

At step 347 the status of the source devices may be changed. The status of the source devices may be updated to indicate that they are in maintenance. The statuses of the source devices, after they have been updated, may indicate that the source devices should no longer be accessed. The source devices may advertise their status on the network, such as by transmitting their status to other devices on the network. The status of the source devices may be updated in a database.

At step 348 physical links may be migrated from the source devices to the replacement devices. A technician may be instructed to migrate the physical links. Lights, such as light emitting diodes (LEDs) on the networking devices, may be activated and/or deactivated to assist the technician during the installation. The lights may indicate locations where the replacement devices should be installed. The lights may indicate ports on the networking devices where cables should be removed or connected during the installation. The lights may be extinguished to indicate that the installation of a component was successful and/or to indicate that the migration was successful.

At step 350, the replacement devices may be advertised on the network. The announcement may be triggered upon detection of physical link disconnection. The replacement devices may be instructed to advertise their presence, address, and/or IP prefixes to other devices on the network. The replacement devices may use the Border Gateway Protocol (BGP), or any other method, to advertise on the network. IP prefixes of servers, or customers, may be advertised on the network. The prefixes may be IPv4 or IPv6 prefixes.

At step 355, the devices, such as servers, that were connected to the source devices may be queried. Devices on the list generated at step 324 may be queried to determine if they are accessible after the replacement devices have been installed. The devices may be queried to determine if they are accessible over the internet. The devices may be pinged to determine whether they are online. Actions that may be performed at step 355 are further described below in regards to FIG. 4.

At step 360, responses to the queries may be received and a determination may be made as to whether all queried servers have responded. If all queried servers have not responded, an error message may be displayed at step 370. The technician may evaluate the error and determine whether the installation should be reversed. If the technician determines to reverse the installation, the migration system may provide instructions for uninstalling the replacement devices and reverting to the source devices. The format of the instructions may be similar to those displayed at step 328. For example, LED lights on the source and replacement devices may indicate where to remove and install cables in order to revert to the source devices.

If an error occurs at step 360, or at any other point during the method 300, the error may be escalated to an appropriate user. For example, if a technician is performing the migration and an error occurs, an error message may be transmitted to an engineer supervising the technician.

If all servers respond to the queries at step 360, the source devices may be decommissioned at step 365. The source devices may be placed in a non-operational state in a device database. The device database may list all devices in a data center, all devices corresponding to an entity, or any other grouping of devices. Alerting corresponding to the source devices may be shut down.

An uplink mapping corresponding to the source devices may be retrieved. Uplinks on the north devices, or parent devices of the replacement devices, may be shut down. Uplinks on the source devices may be shut down. A technician may be instructed to shutdown the source devices, remove any electrical connections to the source devices, and/or remove the source devices from the rack. After the source devices have been decommissioned the migration may be complete. The technician may then perform other migrations.

Figure 4:
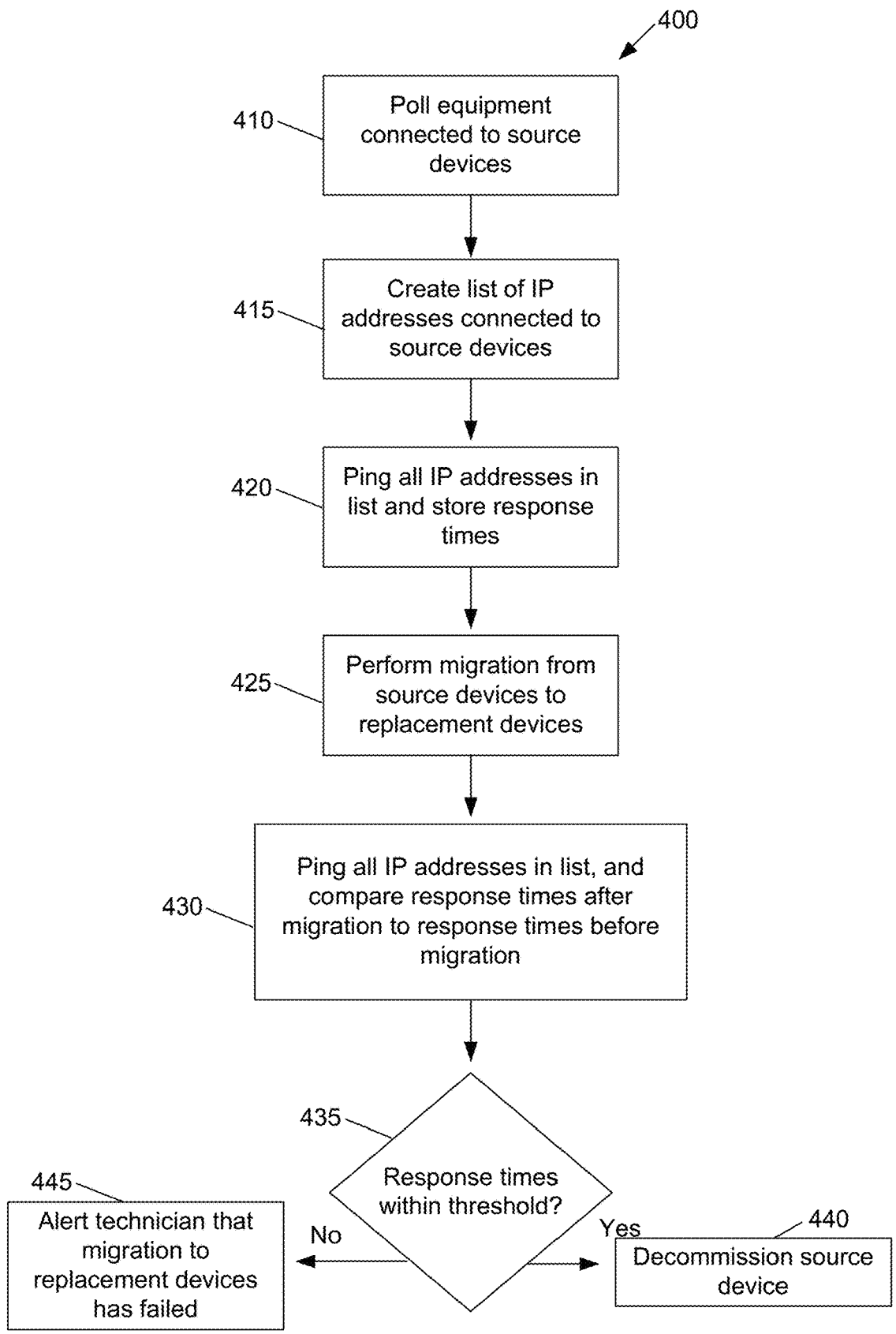
FIG. 4 is a flow diagram of a method for verifying that a migration was successful according to one or more illustrative aspects of the disclosure.

FIG. 4 is a flow diagram of a method for verifying that a migration was successful according to one or more illustrative aspects of the disclosure. In one or more embodiments, the method 400 or one or more steps thereof may be performed by one or more computing devices or entities. For example, portions of the method 400 may be performed by components of the computing device 100. The method 400 or one or more steps thereof may be embodied in computer-executable instructions that are stored in a computer-readable medium, such as a non-transitory computer-readable medium. Some steps or portions of steps in the flow diagram may be omitted or changed in order.

At step 410 servers and/or any other devices connected to source devices may be polled. A network topology may be created to map the network. Instead of, or in addition to the polling, a database may be accessed to determine which servers or other devices are connected to each of the source devices.

At step 415 a list of IP addresses of devices connected to the source devices may be created. The list may comprise identifying information of the polled devices, location information corresponding to the polled devices, and/or any other information corresponding to the polled devices. The information may be stored in a list or in any other suitable data structure, such as a database.

At step 420 a response time corresponding to each of the polled devices may be stored in the list created at step 415. The response time may be determined by pinging each of the IP addresses in the list and recording a response time to the ping. In addition to or instead of the response time, any other metric corresponding to the polled devices may be stored. The response time, or other metric, may be a single measurement, a series of measurements, and/or an average or median of multiple measurements.

At step 425 a migration may be performed from the source devices to the replacement devices. The migration may comprise replacing the source devices with the replacement devices, or causing functions previously performed by the source devices to now be performed by the replacement devices. For example, network cables may be disconnected from the source devices and connected to the replacement devices.

At step 430 each of the IP addresses in the list created at step 415 may be pinged again and a response time may be stored for each IP address. By pinging the IP addresses the system may determine whether devices that were previously serviced by the source devices remain accessible, via the replacement devices, after the migration has been completed. As described above, other metrics may be used instead of in addition to response time.

At step 435 the response times before and after migration may be compared to determine whether the migration was successful. If the response times post-migration are within a pre-set threshold of the pre-migration response times, then the source devices may be decommissioned. If the response times are not within the pre-set threshold, then the technician may be alerted that the migration has failed. For example, the response times may be compared to determine whether the post-migration response times are within twenty percent of the pre-migration response times, and if not then an error may be issued. If an IP address that was previously responsive to a ping is no longer responsive, then the technician may be alerted that the migration has failed. If devices were removed during the migration, the IP address of those devices might not be considered when determining whether the migration was successful.

If the migration is determined to have been successful, because the same equipment that was previously accessible before the migration remains accessible after the migration, or because equivalent equipment is accessible, then the source devices may be decommissioned at step 440.

Figure 5:
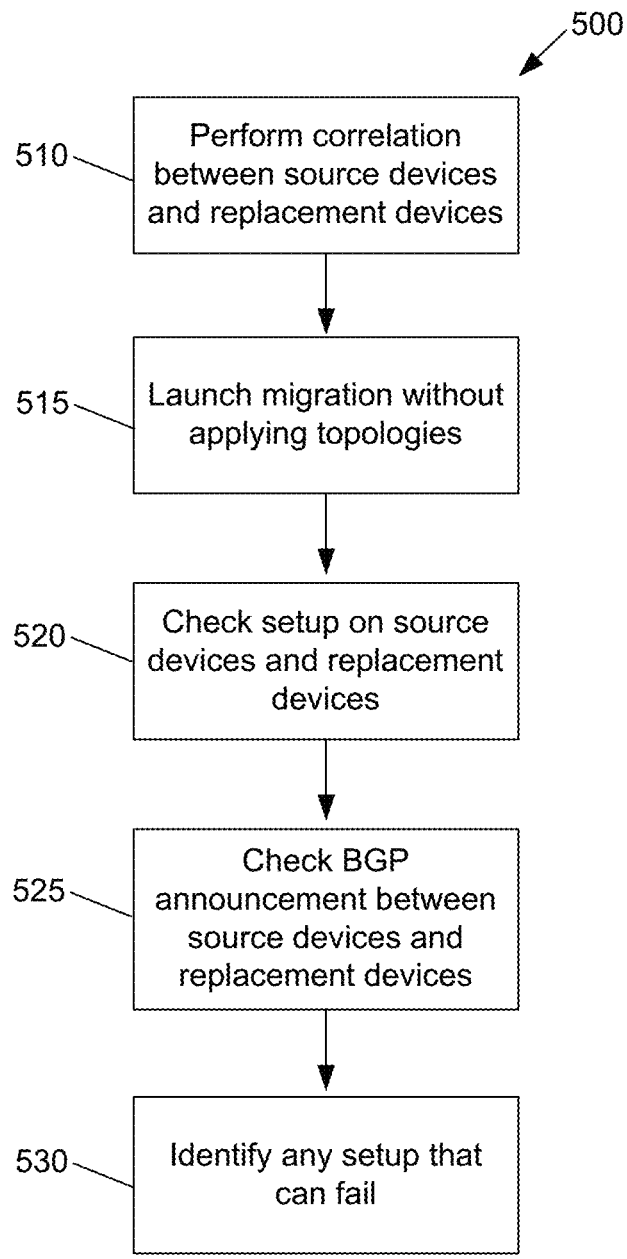
FIG. 5 is a flow diagram of a method for simulating a migration according to one or more illustrative aspects of the disclosure.

FIG. 5 is a flow diagram of a method for simulating a migration according to one or more illustrative aspects of the disclosure. In one or more embodiments, the method 500 or one or more steps thereof may be performed by one or more computing devices or entities. For example, portions of the method 500 may be performed by components of the computing device 100. The method 500 or one or more steps thereof may be embodied in computer-executable instructions that are stored in a computer-readable medium, such as a non-transitory computer-readable medium. Some steps or portions of steps in the flow diagram may be omitted or changed in order.

At step 510 a correlation may be performed between the source devices and the replacement devices. The correlation may correlate functionality of the source devices to the replacement devices. The correlation may assign each function performed by the source devices to the replacement devices. For example, if a server was previously connected to a source device, that server may be assigned to a replacement device during the correlation. The correlation may comprise determining a topology to be applied, to the network, after the replacement devices have been installed. The topology may indicate a structure for the network and/or how each of the replacement devices interact with each other.

At step 515 the migration may be launched without applying any new topologies to the network. Logical parts of the migration may be performed without writing in the database. The logical parts of the migration may comprise steps of the migration performed by software. A determination may be made as to whether the software processes could proceed without error by simulating changes to the database, but those changes might not be saved to the database.

Network operations may be checked to determine whether they will succeed during the migration. A network state may be pre-checked during the simulation, such as by determining whether uplink is up, virtual LAN (VLAN) is up, and/or whether devices have the right VLAN assignment. Database and/or subroutine errors may be detected at step 520. These errors may be corrected by a technician. Errors that occur during the simulation of the migration may be corrected on networking devices.

At step 525 a BGP announcement between the source devices and the replacement devices may be checked. The simulation may determine whether the BGP prefixes of the source devices can be learned. The BGP update may be modeled. A determination may be made as to whether the BGP update will flow between source and replacement devices.

At step 525 a determination may be made of whether any filtering is performed on prefixes, the filtering may be based on prefix content, prefix communities (BGP communities), and/or address family (v4 or v6). A test may be performed of whether the replacement devices can learn a non-customer prefix.

At step 530 any setup that can fail may be identified. Any errors that are detected during the simulation may be escalated. An urgent fix may be implemented if customers are impacted, such as if servers will have downtime. A root cause of the error may be determined. After the root cause of the error is determined, the cause may be repaired, or the cause may be identified before future migrations, to avoid the error occurring again during future migrations.

Figure 6A:
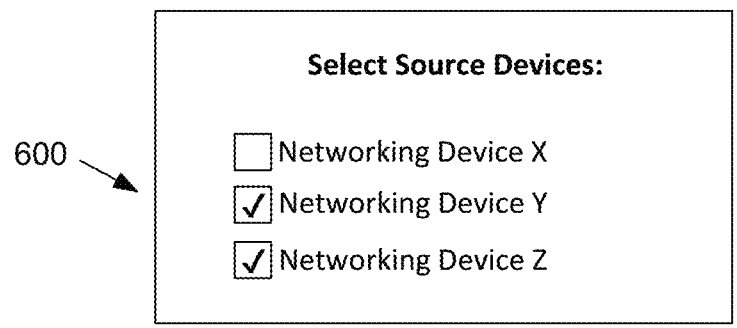
FIGS. 6A-C show examples of user interfaces for performing device migration according to one or more illustrative aspects of the disclosure.

FIG. 6A illustrates a user interface 600 for selecting source devices to migrate according to one or more illustrative aspects of the disclosure. The interface 600 is an example of an interface that may be displayed at step 320 of the method 300. In the interface 600 a user has selected two networking devices to be source devices for the migration, "Networking Device Y" and "Networking Device Z." The selected devices may be routers, switches, devices that perform routing and switching functions, multilayer switches, or any other networking device.

Figure 6B:
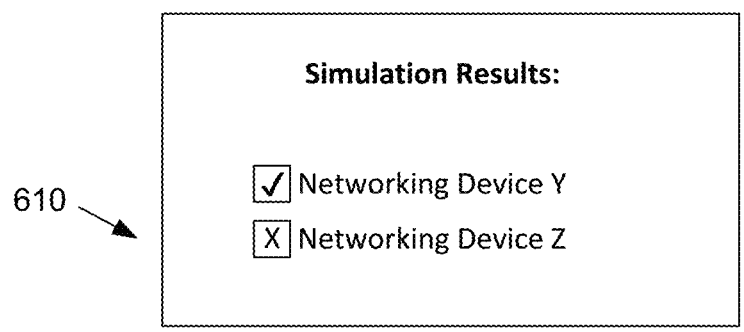

FIG. 6B illustrates a user interface 610 for displaying simulation results according to one or more illustrative aspects of the disclosure. The interface 610 indicates that a simulation was performed for migration of the two source devices selected in the user interface 600, and that the simulation succeeded for "Networking Device Y" but failed for "Networking Device Z."

Figure 6C:
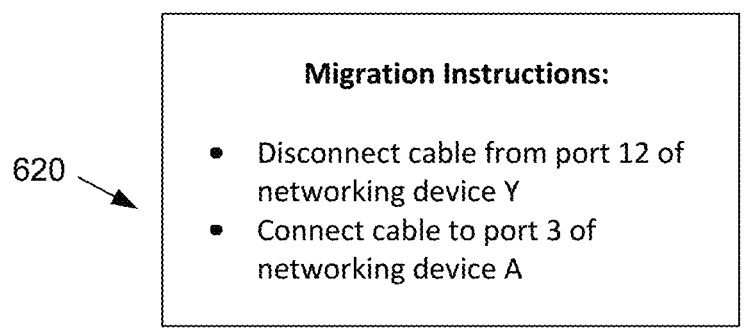

FIG. 6C illustrates a user interface 620 for displaying migration instructions according to one or more illustrative aspects of the disclosure. The user interface 620 comprises an example of instructions that may be displayed to a technician for performing a migration from the source device "Networking Device Y" to a replacement device "Networking Device A."

FIGS. 6A-C may be generated and/or displayed by the migration system 240. It should be understood that the user interfaces illustrated in FIGS. 6A-C are exemplary, and that other user interfaces may be used.

Although example embodiments are described above, the various features and steps may be combined, divided, omitted, rearranged, revised, or augmented in any desired manner, depending on the specific outcome or application. Various alterations, modifications, and improvements will readily occur to those skilled in the art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A computer-implemented method for execution by one or more computing devices, the method comprising:
    receiving, a request to perform a device migration;
    determining, based on the request, one or more first networking devices;
    determining, based on the one or more first networking devices, a plurality of servers corresponding to the one or more first networking devices, wherein the one or more first networking devices provide a network connection to each server of the plurality of servers;
    receiving a selection of one or more second networking devices to replace the one or more first networking devices;
    performing a simulation of the migration from the one or more first networking devices to the one or more second networking devices, the performing of the simulation comprising determining whether the one or more second networking devices can provide services previously provided by the one or more first networking devices, wherein the services comprise providing the network connection to each server of the plurality of servers;

receiving data indicating a time period during which a server of the plurality of servers is unavailable for migration;

after determining that the one or more second networking devices can provide the services previously provided by the one or more first networking devices, and after determining that the migration is scheduled to occur outside of the time period during which the server is unavailable for migration, performing the migration from the one or more first networking devices to the one or more second networking devices, the performing of the migration comprising causing functions previously performed by the one or more first networking devices to now be performed by the one or more second networking devices;

after one or more cables attached to the one or more first networking devices have been disconnected from the one or more first networking devices and have been attached to the one or more second networking devices, polling each server of the plurality of servers to determine that each server of the plurality of servers is accessible via the one or more second networking devices; and after determining that each server of the plurality of servers is accessible via the one or more second networking devices, updating one or more databases to refer to the one or more second networking devices.

2. The method of claim 1, further comprising, after performing the simulation of the migration from the one or more first networking devices to the one or more second networking devices, determining, based on the simulation, that the one or more first networking devices are available for migration, wherein determining that the one or more first networking devices are available for migration comprises determining a physical distance between a networking device of the one or more first networking devices and a networking device of the one or more second networking devices.

3. The method of claim 2, wherein determining that the one or more first networking devices are available for migration comprises determining that the physical distance satisfies a threshold distance.

4. The method of claim 1, wherein determining that each server of the plurality of servers is accessible via the one or more second networking devices comprises transmitting, to each server of the plurality of servers and via the one or more second networking devices, a request.

5. The method of claim 4, wherein determining that each server of the plurality of servers is accessible via the one or more second networking devices comprises receiving, from each server of the plurality of servers, a response to the request.

6. The method of claim 5, further comprising measuring, for each server of the plurality of servers, a response time corresponding to each request, and wherein determining that each server of the plurality of servers is accessible via the one or more second networking devices comprises determining that each response time satisfies a threshold response time.

7. The method of claim 1, further comprising:
receiving, from the one or more first networking devices, configuration information; and
configuring, based on the configuration information, the one or more second networking devices.

8. The method of claim 1, wherein performing the simulation comprises performing a correlation between the one or more first networking devices and the one or more second networking devices, the correlation comprising assigning functions performed by the one or more first networking devices to the one or more second networking devices.

9. The method of claim 1, further comprising causing the one or more second networking devices to advertise their position in a network.

10. The method of claim 1, further comprising displaying instructions to decommission the one or more first networking devices.

11. The method of claim 1, wherein updating the one or more databases comprises removing, from the databases, references to the one or more first networking devices.

12. A system comprising:
at least one processor; and
memory comprising executable instructions, which, when executed by the at least one processor, cause the system to perform:
receiving, a request to perform a device migration; determining, based on the request, one or more first networking devices;
determining, based on the one or more first networking devices, a plurality of servers corresponding to the one or more first networking devices, wherein the one or more first networking devices provide a network connection to each server of the plurality of servers;
receiving a selection of one or more second networking devices to replace the one or more first networking devices;
performing a simulation of the migration from the one or more first networking devices to the one or more second networking devices, the performing of the simulation comprising determining whether the one or more second networking devices can provide services previously provided by the one or more first networking devices, wherein the services comprise providing the network connection to each server of the plurality of servers;
receiving data indicating a time period during which a server of the plurality of servers is unavailable for migration;
after determining that the one or more second networking devices can provide the services previously provided by the one or more first networking devices, and after determining that the migration is scheduled to occur outside of the time period during which the server is unavailable for migration, performing the migration from the one or more first networking devices to the one or more second networking devices, the performing of the migration comprising causing functions previously performed by the one or more first networking devices to now be performed by the one or more second networking devices;
after one or more cables attached to the one or more first networking devices have been disconnected from the one or more first networking devices and have been attached to the one or more second networking devices, polling each server of the plurality of servers to determine that each server of the plurality of servers is accessible via the one or more second networking devices; and
after determining that each server of the plurality of servers is accessible via the one or more second networking devices, updating one or more databases to refer to the one or more second networking devices.

13. The system of claim 12, wherein the instructions, when executed by the at least one processor, cause the system to perform:

determining a physical distance between a networking device of the one or more first networking devices and a networking device of the one or more second networking devices; and determining that the one or more first networking devices are available for migration by determining that the physical distance satisfies a threshold distance.

14. The system of claim 12, wherein the instructions that cause the system to perform determining that each server of the plurality of servers is accessible via the one or more second networking devices comprise instructions that cause the system to perform transmitting, to each server of the plurality of servers and via the one or more second networking devices, a request.

15. The system of claim 14, wherein the instructions that cause the system to perform determining that each server of the plurality of servers is accessible via the one or more second networking devices comprise instructions that cause the system to perform receiving, from each server of the plurality of servers, a response to the request.

16. The system of claim 12, wherein the instructions that cause the system to perform the simulation comprise instructions that cause the system to perform a correlation between the one or more first networking devices and the one or more second networking devices, the correlation comprising assigning functions performed by the one or more first networking devices to the one or more second networking devices.

17. The system of claim 12, wherein the instructions, when executed by the at least one processor, cause the system to perform displaying instructions to decommission the one or more first networking devices.

18. The system of claim 15, wherein the instructions that cause the system to perform determining that each server of the plurality of servers is accessible via the one or more second networking devices comprise instructions that cause the system to perform:

measuring, for each server of the plurality of servers, a response time corresponding to each request; and determining that each response time satisfies a threshold response time.

19. The system of claim 12, wherein the one or more first networking devices comprises one or more routers or one or more switches, wherein the one or more routers or one or more switches are located in a data center, and wherein the plurality of servers are located in the data center.

20. The method of claim 1, wherein the one or more first networking devices comprises one or more routers or one or more switches, wherein the one or more routers or one or more switches are located in a data center, and wherein the plurality of servers are located in the data center.

* * * * *